Figure 1:
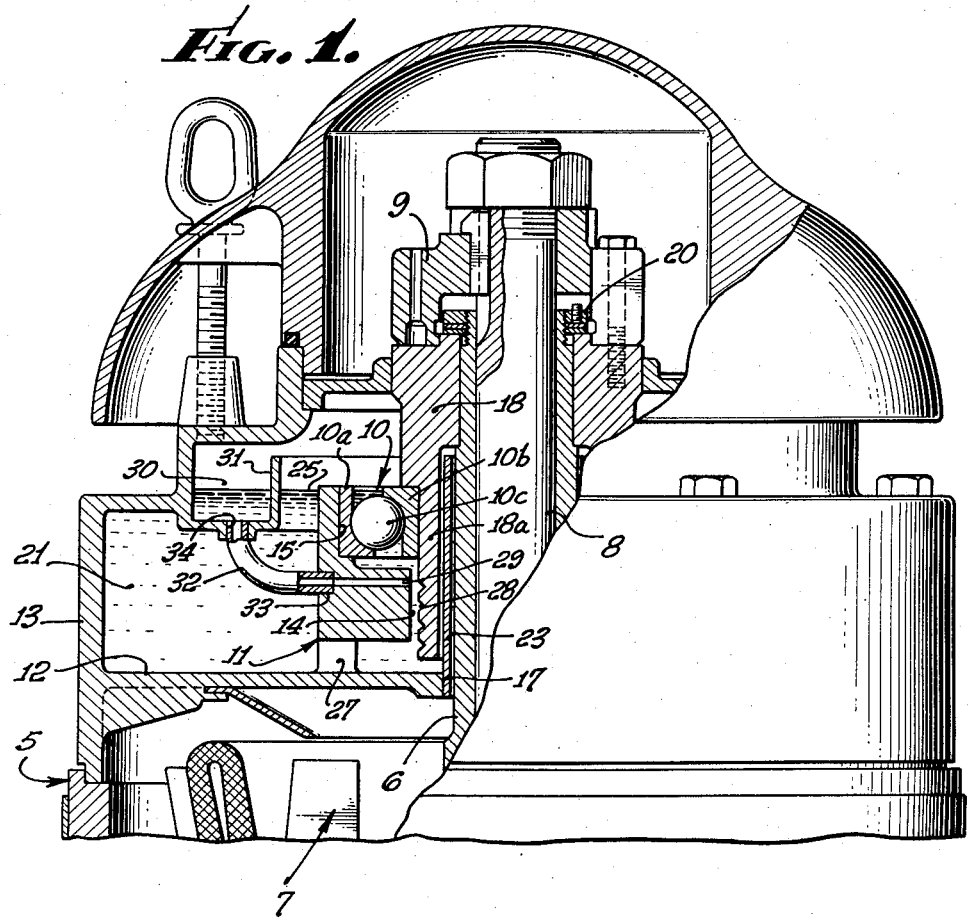

Sept. 1, 1959

F. O. LUENBERGER 2,902,323

LUBRICATION SYSTEM

Filed March 17, 1958

FREDERICK O. LUENBERGER
INVENTOR.

BY *Flam and Flam*

ATTORNEYS.

United States Patent Office 2,902,323
Patented Sept. 1, 1959

2,902,323
LUBRICATION SYSTEM

Frederick O. Luenberger, Los Angeles, Calif., assignor to U.S. Electrical Motors, Inc., Los Angeles, Calif., a corporation of California Application March 17, 1958, Serial No. 721,964

2 Claims. (Cl. 308—187)

This invention relates to a lubrication system for ball bearings or the like.

It is desirable that the ball or roller bearings be submerged in lubricant during periods of shut-down in order to avoid corrosion. During running conditions, it is desirable, from the standpoint of efficient operation, to provide only a small quantity of lubricant to the bearing. Thus, large bearings, and particularly high speed bearings, will churn oil excessively if submerged, causing frothing and undesirable temperature rise.

There have been some attempts to solve this problem by providing a metering orifice to the bearing recess through which the lubricant must pass in order to reach the bearing. Upon operation, the bearing slings lubricant into the main reservoir. The rate at which lubricant is slung outwardly from the bearing recess at first supposedly exceeds the rate at which lubricant enters the recess from the metering orifice. Theoretically an operating condition is reached in which the level of lubricant in the main reservoir is raised slightly, and the bearing cup or recess is partially emptied. When operation ceases, the lubricant in the reservoir and in the bearing cup or recess reaches the same level.

The difficulty with this arrangement is that the level of lubricant in the casing is quite critical. The normal level of lubricant in the reservoir should be only slightly greater than the level of the rolling elements of the bearing, and the ledge over which lubricant is slung by the bearing should also be only slightly higher than the rolling elements in order to achieve efficient slinging. Unless the lubricant is filled fairly precisely to a predetermined level between that of the ledge and the top of the rolling elements, there are created alternate undesirable conditions. First, if the level is too high, the oil thrown out by the bearing will reenter over the ledge and the bearing will always run in a submerged condition. If the level of lubricant is too low, then during static conditions the bearing will not be submerged.

The primary object of this invention is to provide an improved lubrication system that achieved the desired operation of ball bearing structures without requiring critical filling of lubricant in the reservoir. This is accomplished by providing a supplemental reservoir that communicates with the main reservoir. When the apparatus is in operation, fluid is constantly pumped into the supplemental reservoir and the level of lubricant in the main reservoir is diminished to a point sufficient to ensure against reentry of lubricant over the bearing ledge and, at the same time, the level in the bearing recess recedes.

When operation ceases, the fluid contained in the supplemental reservoir drains back to the main reservoir and a level sufficient to submerge the bearing is achieved.

Another object of this invention is to provide a lubrication system of this character which does not require a metering orifice. Therefore, there is virtually no danger of clogging of the oil supply line to the bearing. To accomplish this and the foregoing functions, a single pump structure is used. The pump forces fluid into the supplemental reservoir, lowering the running level in the main reservoir to below the bearing structure, and the pump also supplies a charge of lubricant to the bearing structure.

Another object of this invention is to provide a system of this character utilizing simple structure readily incorporated in motors, transmissions or like rotary apparatus.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Figure 2:
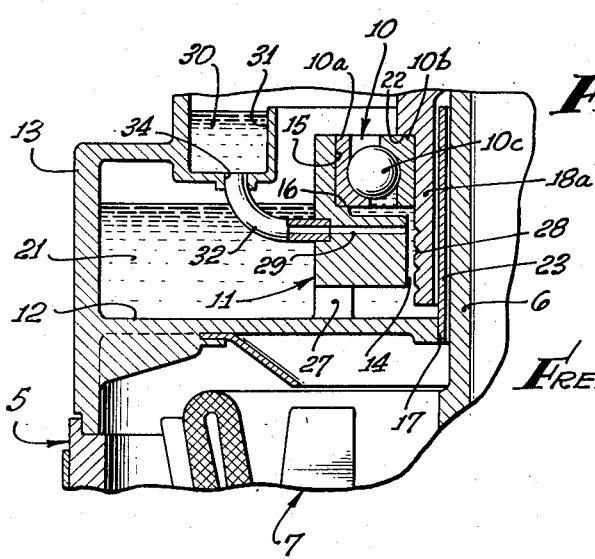

Referring to the drawings:

Figure 1 is a fragmentary sectional view of rotary apparatus, in this instance a motor in which the lubrication system is incorporated; and Fig. 2 is a fragmentary sectional view similar to Fig. 1, but illustrating the apparatus in running condition.

In Fig. 1, there is illustrated, by way of example, a vertical motor 5 having a hollow shaft 6 upon which a rotor 7 is supported. An upper bearing structure 10 is provided for the shaft 6. It is mounted by a cup or annular boss 11 formed on a partition wall 12 of the upper motor end bracket 13.

The boss 11 has a through aperture 14 provided with an enlargement 15 at its upper end defining a recess for reception of the outer race 10a of the bearing structure 10. The outer race 10a seats against a shoulder 16 which defines the enlargement 15.

The shaft 6 extends upwardly through the boss 11 and with clearance past a restriction 17 at the bottom of the boss aperture 14. The upper end of the shaft is splined to a coupling member 18 which accommodates the inner race 10b of the bearing structure 10. For this purpose, the coupling member has a flange 18a extending downwardly through the inner race and defining a shoulder 22 abutting the upper end of the inner race 10b.

The weight of the rotor is transferred to the coupling member 18 by a nut 20 threadedly carried by the upper end of the shaft. The coupling member 18 drives a load shaft 8 through a companion coupling member 9.

The flange 18a of the coupling member 18 encompasses with clearance the hollow shaft 6 and defines an annular space therewith. An upstanding sleeve 23, accommodated in the restriction 17 of the boss bore 14, projects into the space between the coupling member flange 18a. The bracket 13, the partition wall 12 and the sleeve 23 together define a main lubricant reservoir 21.

The normal or static level of lubricant in the reservoir 21, and illustrated at 25, is above the level of the rolling elements 10c of the bearing structure 10 and adjacent the top of the bearing recess 15 which corresponds to the upper edge of the outer bearing race 10a. The lower portion of the bearing 10 is in communication with the main body of the reservoir via openings 27 formed at the base of the boss 11. Hence, during static conditions, the bearing structure 10 is submerged. On operation of the motor, fluid is pumped out of the main reservoir 21 in order to reduce the running level thereof. For this purpose, the flange 18a of the coupling element 18 has helical grooves 28 forming with the bore 14 a spiral pump.

Located near the upper turns of the spiral grooves 28 is an outlet 29 which extends radially from the bore 14. The pump outlet 29 communicates with a supplemental annular reservoir 30 which extends at least partially above the level of lubricant in the main reservoir. The reservoir 30 is formed within the bracket structure 13 by an annular wall 31 of angled cross-section. The inner wall of the bracket 13 forms the supplemental reservoir 30 with the wall 31.

A conduit 32 connects the outlet 29 to the bottom of the supplemental reservoir 30. For this purpose, one end of the conduit 32 projects within a socket formed as an enlargement 33 at the outer end of the outlet opening 29; and the other end of the conduit 32 is press-fitted within an opening 34 in the bottom of the wall 31.

The lubricant rises to a level in the supplemental reservoir 30 an amount determined by the pressure at the outlet 29. By providing sufficiently small clearance between the helical groove 28 and the boss aperture 14, a pressure is provide sufficient to extract enough lubricant to lower the level in the main reservoir to a point below the bearing 10, as illustrated in Fig. 2.

The pump also provides lubricant to the bearing structure 10, as illustrated in Fig. 2, the level of lubricant in the interior of the cup rising above the bottom of the bearing 10 as compared with the level in the main body of the reservoir 21 by virtue of the action of the pump.

In operation, the bearing splashes excess oil outwardly over the cup provided by the boss 11 and it drains back into the main body of the reservoir 21. There is no danger that this expelled lubricant can reenter over the top of the bearing cup by virtue of the lowering of the level of liquid in the reservoir 21.

When the apparatus is stopped, the action of the pump cases and the lubricant in the reservoir 30 drains until the levels in the two reservoirs are equal. In this condition, the bearing structure 10 is submerged.

The level to which lubricant is filled in the main reservoir is not critical, and it may actually be above the top of the bearing recess 15 although it is illustrated in Fig. 1 to be just below the top of the bearing recess 15.

The inventor claims:

1. In a lubrication system for submerging a bearing only during idle conditions: means forming a main lubricant reservoir; a bearing cup adjoining the main reservoir; a shaft extending in the cup and supported by the bearing; means forming an opening between the reservoir and the bottom of the cup; means forming a supplemental reservoir; pump means carried by the shaft and drawing upon the lubricant in the main reservoir via said opening for urging lubricant into the cup; and means forming a passage between the supplemental reservoir and the pressure side of said pump for relatively elevating the level of lubricant in said supplemental reservoir and for relatively lowering the level of lubricant in said main reservoir and said cup only during operation of said pump.

2. In a lubrication system for submerging a bearing of rotary apparatus only during idle conditions: a rotary device having a bracket; a bearing cup formed in the bracket, the exterior of the cup and the bracket defining a main lubricant reservoir; a bearing in the cup; there being an opening in the cup beneath the bearing; said rotary apparatus having a shaft extending in the cup; an annular wall member affixed to the bracket and defining a supplemental reservoir and having a portion projecting upwardly to separate to predetermined limits the upper surfaces of lubricant in the respective reservoirs; a pump carried by the shaft and drawing upon the lubricant in the main reservoir via said opening for urging lubricant into the cup; the opening forming an inlet and the cup forming an outlet; and a conduit between the bottom of the supplemental reservoir and the pump outlet for relatively elevating the level of lubricant in said supplemental reservoir and for relatively lowering the level of lubricant in said main reservoir and said cup only during operation of said pump; the pump maintaining a supply of lubricant for the bearing despite variation in the level of lubricant in the main reservoir.

References Cited in the file of this patent

UNITED STATES PATENTS 2,427,748    Schuck _____ Sept. 23, 1947